(12) United States Patent
Jakubowski, Jr. et al.

(10) Patent No.: US 6,347,768 B1
(45) Date of Patent: Feb. 19, 2002

(54) AUTOMATIC AND SEQUENCING ACTUATION ASSEMBLY FOR A WEAPON EJECTION SYSTEM AND ASSOCIATED METHOD

(75) Inventors: Thaddeus Jakubowski, Jr., St. Charles; John K. Foster, Florissant, both of MO (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/571,096

(22) Filed: May 15, 2000

(51) Int. Cl.[7] .................................................. B64D 1/04
(52) U.S. Cl. ......................... 244/137.4; 89/1.54; 91/468
(58) Field of Search .................... 246/137.4; 89/1.51, 89/1.53, 1.54, 1.59; 91/468, 442, 441; 60/413; 292/144; 294/82.26, 82.36

(56) References Cited

U.S. PATENT DOCUMENTS

| 3,010,752 A | * | 11/1961 | Geffner .................... 244/137.4 |
| 3,500,716 A | * | 3/1970 | Schnepfe et al. ......... 244/137.4 |
| 4,257,567 A | * | 3/1981 | Hasquenoph et al. .... 244/137.4 |
| 4,441,674 A | | 4/1984 | Holtrop |
| 5,052,639 A | | 10/1991 | Lemacon |
| 5,065,961 A | | 11/1991 | Ellis et al. |
| 5,088,664 A | | 2/1992 | Ellis et al. |
| 5,583,312 A | | 12/1996 | Jakubowski, Jr. et al. |
| 5,857,647 A | * | 1/1999 | Jakubowski, Jr. et al. ........... 244/137.4 |
| 6,009,788 A | | 1/2000 | Jakubowski, Jr. et al. |
| 6,035,759 A | | 3/2000 | Jakubowski, Jr. et al. |

* cited by examiner

Primary Examiner—Galen L. Barefoot
(74) Attorney, Agent, or Firm—Alston & Bird LLP

(57) ABSTRACT

An automatic and sequencing pneumatic actuation assembly is provided for use in an ejection system capable of unlocking and forcibly ejecting stores from racks mounted on an aircraft or similar weapon carrier. The actuation assembly including a primary valve and release ram for reciprocating movement along a common longitudinal axis between closed and open positions. A solenoid control valve initiates movement of the primary valve by creating a pressure imbalance across the primary valve. Pressurized gas is caused to vent to an environment having a pressure lower than the pressurized gas, allowing the primary valve to move the release ram into engagement with a mechanism capable of unlocking the hooks before moving ejector pistons to forcibly eject the unlocked stores. A bias member is provided for automatically returning the primary valve to the closed position after the stores have been released.

24 Claims, 3 Drawing Sheets

AUTOMATIC AND SEQUENCING ACTUATION ASSEMBLY FOR A WEAPON EJECTION SYSTEM AND ASSOCIATED METHOD

FIELD OF THE INVENTION

The present invention relates generally to aircraft weapons systems, and more particularly to store carriers for carrying a releasable store on an aircraft.

BACKGROUND OF THE INVENTION

Military aircraft utilize racks located beneath the wings and fuselage to carry and dispense stores upon command. Stores may be used to contain munitions i.e. bombs, or to contain other material to be dropped from the aircraft i.e. rockets or missiles upon command. Typical ejector racks are shown in U.S. Pat. Nos. 4,043,525 and 4,347,777, which are herein incorporated by reference.

Conventionally, an ejector rack includes a release mechanism which is activated to mechanically release and subsequently forcibly eject the stores from the aircraft. Most ejector racks at one time utilized pyrotechnic (explosive) cartridges which, upon ignition, generate high pressure gas for actuating the mechanical release mechanism, as well as providing high pressure gas to forcibly eject the store from the rack mounted on the aircraft.

Ejection systems that employ pyrotechnic cartridges have certain undesirable characteristics. For example, a great deal of cleaning and maintenance is required after firing a pyrotechnic cartridge. When fired, the chemical burning of the explosive charge within the pyrotechnic cartridge results in a large amount of residue being deposited within the system. This residue also contains moisture and corrosives. After burning, the moisture in the system tends to further gather debris, form ice, and otherwise clog the internal and external workings of the bomb rack mechanism. If not properly disassembled and cleaned after a scheduled number of firings, at high cost and a great deal of labor and downtime for the aircraft, an ejection system utilizing pyrotechnic cartridges will quickly corrode and become unreliable.

In order to avoid the inherent problems associated with the pyrotechnic cartridge, the inventor of the present invention devised a unique pneumatic ejector rack assembly set forth in U.S. Pat. No. 5,583,312 (hereinafter referred to as the '312 patent) entitled COLD GAS EJECTOR RACK, issued Dec. 10, 1996, which is herein incorporated by reference. The '312 patent describes a pressurization system capable of servicing one or more store release systems, which system uses air or one of any number of clean, non-pyrotechnic pressurized gases both as the energy source and energy transfer medium. Preferably, the aircraft contains a miniature compressor and purification system. Ambient air is filtered, dried and stored as an energy medium. Using purified air eliminates the excessive cleaning burden imposed when using pyrotechnics, and also eliminates the sealing problems associated with hydraulics.

As described in detail in the '312 patent, the ejection system includes an on-board source of pressurized non-pyrotechnic gas, at least one release mechanism for mounting the store on the aircraft, and an actuation system for driving the release mechanism between closed and open positions. The actuation system includes an accumulator for receiving and storing pressurized gas from a source which may or may not be located on-board the aircraft. Actuation of a control valve causes a primary valve to move in a linear direction from a closed position to an open position (see FIG. 3 of the '312 patent). This movement allows pressurized gas, i.e. air, to flow from the accumulator into the actuation chamber, forcing a separate, hook release piston to move in a linear direction as shown in the same FIG. 3 of the '312 patent. As a result, the pressurized gas forces a ram attached to the hook release piston to engage and unlock the hooks holding the stores to the rack. Pressurized gas entering the actuator chamber is further capable of exiting from an opposite end of the actuator chamber and flowing into one or more feed tubes that deliver the pressurized gas into engagement with thrust pistons, wherein the pressurized gas causes the thrust pistons to forcibly eject the newly unlocked stores from the rack.

While the ejection system disclosed in the '312 patent provides a significant improvement over earlier pyrotechnic ejection systems due to a substantial reduction in the amount of required maintenance that needs to be performed as compared to the maintenance performed on a pyrotechnic driven ejection system, it has been discovered that by employing a pneumatically powered primary valve reciprocating along a first axis and a separate release piston reciprocating along a second, non-aligned axis as disclosed in the '312 patent, there is a significant reduction in the usable volume of the accumulator. This reduction in volume occurs due to the fact that the primary valve extends into a portion of the volume that would otherwise be available to the accumulator. In order for the accumulator to accommodate enough pressurized gas to provide sufficient force to unlock the hooks and forcibly eject the stores, the volume of the accumulator needs to be increased. This is achieved by increasing the outer surface area of the accumulator, as shown by the shape of accumulator 22 surrounding the actuator assembly in FIG. 2 of the '312 patent, making it difficult for the pneumatic ejection system described in the '312 patent to occupy the same breech volume as occupied by a conventional pyrotechnic cartridge ejection system. In effect, the ejection system disclosed in the '312 patent is able to reduce the overall maintenance requirements of the actuator assembly at the unsatisfactory cost of an increase in size of the accumulator. As a result, the ejection system may not fit in a rack previously designed to employ a pyrotechnic cartridge without significant redesign.

Accordingly, U.S. Pat. No. 5,857,647 (hereinafter referred to as the '647 patent) entitled INTEGRAL ACCUMULATOR VALVE AND RAM ASSEMBLY FOR PNEUMATIC WEAPON EJECTION SYSTEM, issued Jan. 12, 1999, which is herein incorporated by reference, discloses an improved ejection system comprising a pneumatic actuation assembly having a primary valve and a release ram attached thereto for reciprocating movement along a common longitudinal axis between open and closed positions in fluid communication with an accumulator which acts as a source of pressurized gas. A solenoid control valve initiates movement of the primary valve by creating a pressure imbalance across the primary valve member, allowing the primary valve member to move the attached release ram into engagement with a release mechanism capable of releasing the stores from the aircraft.

While the '647 patent provides a significant advancement in aircraft stores ejection systems, several problems remain unaddressed. In particular, the integral primary valve and ram assembly of the '647 patent requires the release ram to be manually reset by ground personnel after an operation cycle such that the primary valve is returned to the closed position prior to the next operation cycle. If the primary valve is not manually repositioned to the closed position, a pressure imbalance will occur during the next operation cycle, and the accumulator will not recharge with pressurized gas. The time required to reset the valve increases work load and maintenance time, as well as introducing the possibility of human error.

Another problem with conventional stores ejection systems is in the sequencing of the release ram and the release of the pressurized gas from the accumulator. More specifically, a typical problem with conventional systems, particularly with pyrotechnic racks, is that when the pyrotechnic cartridges are ignited, the cartridges not only pressurize the release mechanism, but simultaneously pressurize ejection devices that push the store away from the aircraft. As a result of this simultaneous activity, the loads experienced by the hooks securing the store are increased, which can cause the hooks to jam and not release the store. This "hung store" condition is the result of excessive loads being introduced on the hooks during firing, effectively stalling the hook opening mechanism.

Based on the above and foregoing, it can be appreciated that there presently exists a need in the art for an ejection system actuator mechanism that utilizes pneumatic pressure to release and forcibly eject stores from their respective racks while still fitting within a conventional breech volume initially designed for pyrotechnic cartridges. There also exists a need for automatically resetting the primary valve to the closed position after an operation cycle, preferably while the aircraft is still in flight. Furthermore, there also exists a need for sequencing the movement of the release ram and the release of the pressurized air from the accumulator to the ejection devices to prevent "hung stores."

SUMMARY OF THE INVENTION

The present invention provides an improved stores release and ejection actuation assembly and associated method which automatically resets at the end of a release and ejection event. Advantageously, the actuation assembly of the present invention includes a bias member which automatically resets the assembly, thus eliminating the need for manually resetting the assembly as required in conventional assemblies. In addition, the actuation assembly of the present invention provides an efficient design that requires no precision adjustments.

In particular, the actuation assembly of the present invention comprises a primary valve for reciprocating movement within a fluid chamber between open and closed positions. The fluid chamber has a first portion that is in fluid communication with a pressurized gas, and a second portion that is selectively in fluid communication with either the pressurized gas or with an environment having a pressure lower than the pressurized gas. In one embodiment, an accumulator is provided for receiving and storing the pressurized gas.

The actuation assembly also preferably includes a control valve, such as a solenoid control valve, for initiating movement of the primary valve between the closed position and the open position. The control valve includes an inner valve member enclosed by a sleeve member. The inner valve member defines a passageway therethrough that cooperates with openings defined by the sleeve member for allowing fluid communication between the second portion of the fluid chamber and either the first portion of the fluid chamber or the environment having a pressure lower than the pressurized gas.

The actuation assembly of the present invention also includes a release ram responsive to the primary valve. The release ram is typically positioned outside the fluid chamber and operably connected to a release mechanism for releasing a store, such that the store is released by the release mechanism when the release ram is extended and engages the release mechanism. In one embodiment, the release ram is connected to the primary valve by a rod extending therebetween. In this regard, the primary valve functions as a release piston controlling movement of the release ram, thereby completely eliminating the need for a separate release piston assembly.

Advantageously, the actuation assembly of the present invention also includes a mechanical bias member, such as a spring, for automatically repositioning the primary valve from the open position to the closed position. In one embodiment, the bias member is disposed around the rod extending between the primary valve and the release ram and is coaxial therewith along a single longitudinal axis. The bias member is adapted for automatically resetting the primary valve after the release mechanism is fully engaged by the release ram. In one embodiment, the bias member has a constant spring rate, and may further be adapted for moving the primary valve into the closed position when no more than a predetermined pressure differential is established between the first and second portions of the fluid chamber.

According to one advantageous embodiment of the actuation assembly of the present invention, the primary valve includes a first side being selectively in fluid communication with the first portion of the fluid chamber, and a second side in fluid communication with the second portion of the fluid chamber. The first side has a surface area greater than the surface area of the second side. Advantageously, the first side has a shape selected to prevent fluid communication between the fluid chamber and a mechanism capable of forcibly ejecting the store from the aircraft, such as ejector pistons, until the release ram fully engages the release mechanism. In one embodiment, the shape of the first side of the primary valve is defined by a tab member capable of slidably engaging an opening defined by the fluid chamber that otherwise allows fluid communication between the fluid channel and the ejector pistons. In this regard, the primary valve acts to prevent the fluid chamber from being in fluid communication with the ejector pistons during movement of the release ram. Thus, it is possible to sequence the release and ejecting events such that the release ram is allowed to fully engage the release mechanism prior to the movement of the primary valve causing the tab member to be removed from the opening defined by the fluid chamber such that the fluid chamber is placed in fluid communication with the ejector pistons. As such, the release mechanism is prevented from experiencing simultaneous loads from the release ram and the ejector pistons, which can cause the hung store condition described above.

When it is desired for the primary valve to be in its closed position, the control valve is set to provide direct fluid communication between the second portion of the fluid chamber and the pressurized gas stored in the accumulator while preventing the pressurized gas from flowing from the accumulator through the control valve to the environment having a pressure lower than the pressurized gas. Pressurized gas acts against the second side of the primary valve, forcing the primary valve into contact with a valve seat.

When it is desired to open the primary valve, a signal is sent to move the control valve to an energized position, establishing direct fluid communication between the second portion of the fluid chamber and the environment having a pressure lower than the pressurized gas, such as the atmosphere. As pressurized gas in the fluid chamber vents to the atmosphere, a pressure differential or imbalance is created in the fluid chamber across the primary valve, causing the primary valve to move towards the second portion of the fluid chamber. The pressure differential causes the primary valve to unseat from the valve seat, which allows the pressurized gas occupying the first portion of the fluid chamber to flow through the opening defined by the fluid chamber that was previously plugged by the tab member and into a feed tube leading to the ejector pistons. As the primary valve continues to move towards the second portion of the fluid chamber, additional pressurized gas is able to enter the fluid chamber from the accumulator to increase the speed at which the primary valve moves toward the second portion of the fluid chamber. Because the release ram is attached for joint movement with the primary valve, the release ram rapidly moves into engagement with and unlocks the release mechanism, such as hooks, holding the stores to a rack.

During the ejection event, the control valve may be signaled to return to an unenergized position. However, the first side of the primary valve has a greater surface area than the surface area of the second side, as mentioned above. Thus, when the primary valve is in the open position, the release ram will remain in an engaged position if the pressure on the opposite sides of the primary valve is equal or even if the pressure on the second side of the primary valve is slightly greater than the pressure on the first side, if not for the bias member provided by the actuation assembly of the present invention. However, the bias member provides sufficient force to overcome the force imbalance resulting from the pressure differential across the primary valve. According to the present invention, the bias member is capable of automatically returning the release ram to a disengaged position and returning the primary valve to the closed position when the control valve is returned to the unenergized position. Advantageously, the actuation assembly of the present invention requires only a short electrical signal to energize the control valve, such as a burst, rather than requiring a constant electrical signal to the control valve.

Thus, the actuation assembly and associated method of the present invention provide an improved actuation assembly for use with an aircraft store release and ejection system. In particular, the actuation assembly of the present invention provides a bias member for automatically resetting the primary valve to a closed position, which eliminates maintenance time by ground personnel for each release cycle and eliminates human error in resetting the assembly. In one advantageous embodiment, the primary valve of the actuation assembly has a shape selected for preventing fluid communication between the fluid chamber and the mechanism capable of forcibly ejecting the stores from the aircraft until the release ram has fully engaged the release mechanism. Thus, the release event and the ejection event can be sequenced such that the release event occurs a predetermined time interval before the ejection event in order to prevent a hung store condition.

BRIEF DESCRIPTION OF THE DRAWINGS

These and various other features and advantages of the present invention will be readily understood with reference to the following detailed description read in conjunction with the attached drawings, which are not necessarily drawn to scale, wherein:

FIG. 3 is a perspective view showing the relative locations of the accumulator and actuator assembly of FIG. 1; and.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention provides an integral primary valve and release ram actuator assembly adaptable for use in a pneumatic ejection system of the type described in U.S. Pat. No. 5,857,647 (hereinafter referred to as "the '647 patent"), which is herein incorporated by reference. More particularly, the present invention provides an improved pneumatic actuator assembly including a bias member that automatically resets a primary valve and release ram after a release and ejection cycle for a store releaseably attached to an aircraft.

Figure 1:
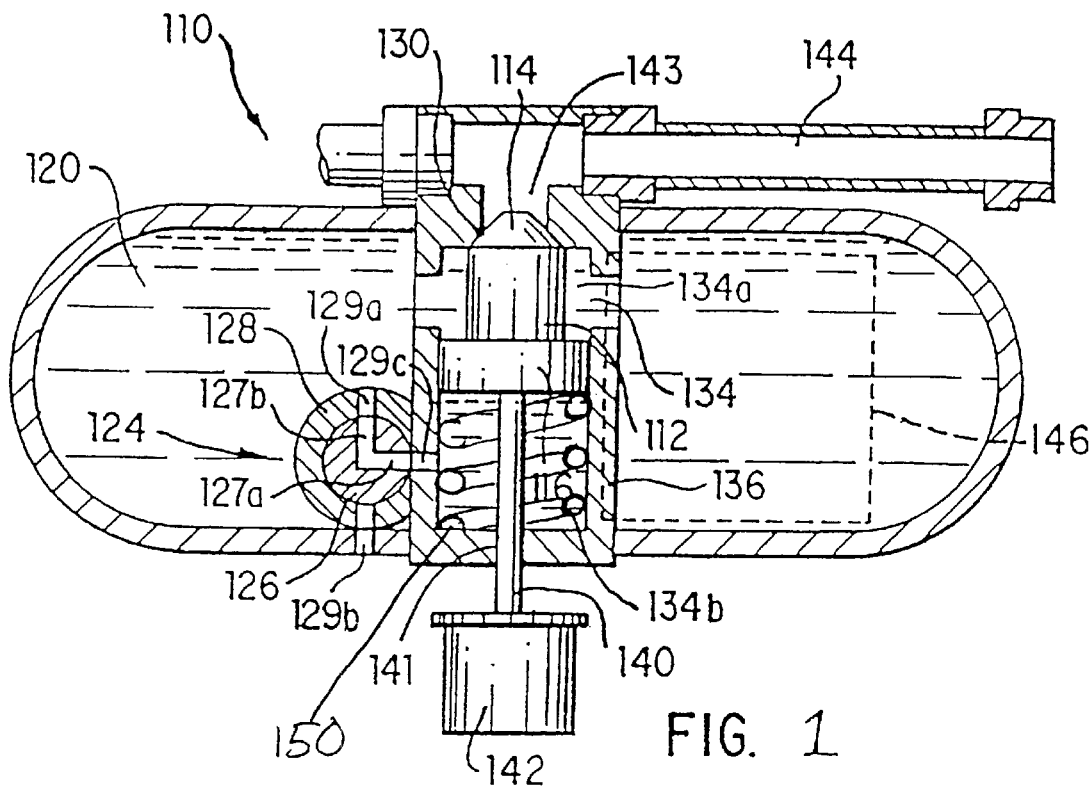
FIG. 1 is a cross-sectional view of an improved pneumatic accumulator and valve constructed in accordance with one embodiment of the present invention as shown in the closed position.
Figure 2:
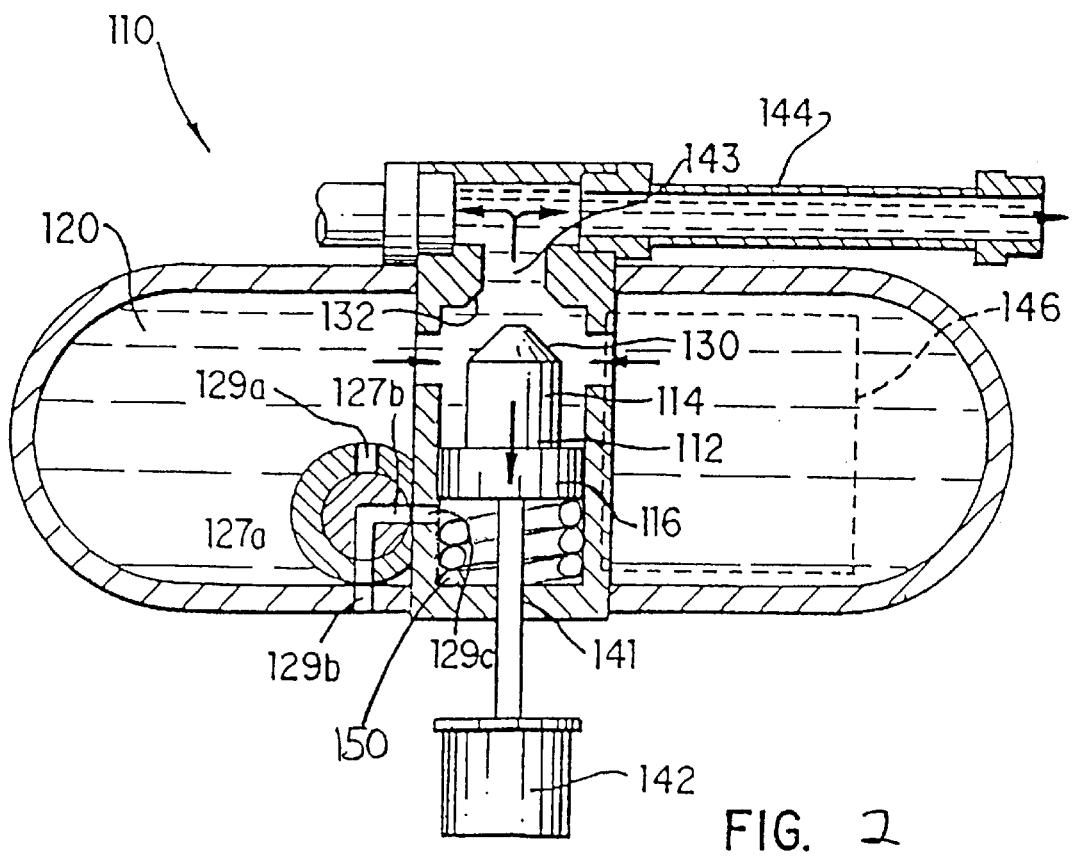
FIG. 2 is a cross-sectional view of the assembly of FIG. 1 as shown in the open position.
Figure 3:
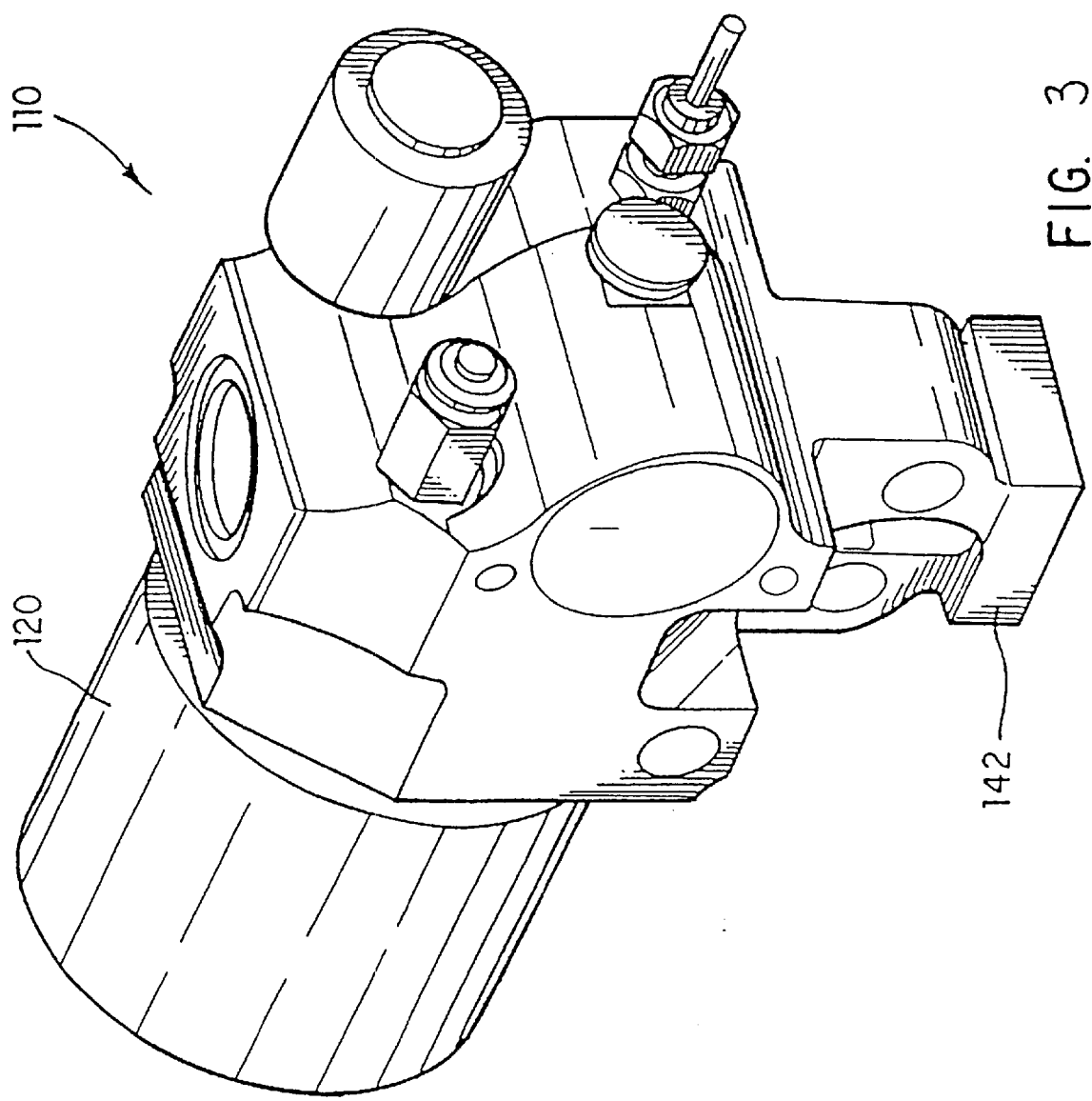

Turning first to FIGS. 1–3, an actuation assembly 110 is provided according to one embodiment of the present invention. The pneumatically driven release and ejection actuator assembly 110 is shown in perspective in FIG. 3, wherein an accumulator 120 having a cylindrical shaped configuration extends outwardly from the main body of the assembly 110. The accumulator 120 may have other shapes, however, such as spherical. As described below, the accumulator 120 is capable of receiving and storing a quantity of pressurized gas.

As shown in FIGS. 1 and 2, the actuation assembly 110 includes a cylindrical jacket 136 which partially encloses and forms a central fluid chamber 134. A primary release valve 112 is positioned for reciprocating along a longitudinal axis extending through the fluid chamber 134 within the accumulator. The primary valve 112 includes an elongated valve stem 114 and a cylindrical valve head 116, with the valve stem attached to and extending outwardly from a first or front side of the valve head. An outer, cylindrical surface of the valve head 116 contacts the cylindrical inner surface of the jacket 136, forming a seal that prevents pressurized gas from moving across the valve head between a first or front end portion 134a and a second or back end portion 134b of the fluid chamber 134. In this regard, the accumulator 120 is in continuous fluid communication with the front end portion 134a of the fluid chamber 134, while the back end portion 134b is selectively in fluid communication with the accumulator or with a lower pressure environment. In one embodiment, the valve stem 114 includes a frustoconical front end 130 extending within the front end portion 134a of the fluid chamber 134. The front end 130 of the valve stem 114 is also disposed to engage and mate with a recessed valve seat 132 formed in the jacket 136.

The jacket 136 also defines an opening 143 extending through the valve seat 132 at the front end portion 134a of the fluid chamber. The opening 143 engages at least one feed tube 144 servicing one or more ejector pistons (not shown), but preferably of the type shown in U.S. Pat. No. 5,583,312 (hereinafter referred to as "the '312 patent"), which is herein incorporated by reference. As the primary valve 112 reciprocates within the fluid chamber 134, the front end 130 of the valve stem 114 either engages or disengages from the mating valve seat 132, thereby selectively closing or opening a fluid passageway extending from the fluid chamber, through the opening 143 and into the feed tube 144.

The jacket 136 includes a back wall defining the an opening 141. Preferably, the openings 141 and 143 face each other along a longitudinal axis extending through the fluid chamber 134. As such, the actuation assembly can include a rod 140 attached to a back side of the valve head 116 which extends from the valve head, through the opening 141 and into attachment with a release ram 142.

The actuation assembly 110 also includes a control valve assembly 124 adaptable for selectively opening and closing primary valve 112. The control valve 124, such as a solenoid valve, is positioned within the accumulator 120 and located adjacent to a wall of the jacket 136. In one embodiment, the control valve 124 includes an inner valve member 126 enclosed by a hollow sleeve 128. A pair of fluid conduits 127a and 127b are joined together to form a continuous, fluid passageway extending through the inner valve member 126. While the valve member 126 is depicted in FIGS. 1 and 2 as circular with the continuous passageway having an "L"-shaped configuration, the drawing is only intended to be a schematic representation of the inner valve 126 and the conduits 127a and 127b. Alternatively, the inner valve 126 may be formed as an elongated rod with a number of lands arranged to selectively open and close the conduits extending through the hollow sleeve, in order to selectively form fluid passageways through the control valve assembly 124. The conduits extending through the inner valve member 126 can be of any desired shape, provided proper fluid passageways are created between the accumulator 120, fluid chamber 134 and an environment having a pressure lower than that of the pressurized gas as will be explained.

The hollow sleeve member 128 defines first and second fluid ports 129a and 129b each extending through the sleeve into an interior space occupied by the inner valve member 126. The ports are constructed such that in a first position, one end of the first port 129a is in fluid communication with an interior portion of the accumulator 120, while the other end is in fluid communication with the interior opening formed within the sleeve 128, thereby forming a connecting passageway between the accumulator 120 and the interior of the sleeve. In a similar manner, one end of the second port 129b is in fluid communication with an environment having a pressure lower than that of the pressurized gas. For convenience, the atmosphere is referenced hereinbelow as an example of one environment having a pressure lower than that of the pressurized gas, although similar environments may also be provided by other sources, such as by an auxiliary storage device (not shown). An opposite end of the second port 129b opens into the interior of the sleeve 128, thereby forming a vent passageway between the inner valve member 126 and the atmosphere. A third port 129c extends through the jacket 136 with one end in fluid communication with the back end portion 134b of the fluid chamber 134 and an opposite end in fluid communication with the interior portion of the sleeve 128, thereby forming a release passageway between the fluid chamber 134 and the inner valve member 126.

The ports 129a, 129b and 129c are arranged such that when the control valve 124 is in an unenergized or closed position as shown in FIG. 1, the connecting passageway formed by the port 129a is in fluid communication with the inner passageway formed by the conduit 127b joining the inner passageway formed by the conduit 127a with the release passageway formed by the port 129c. This creates a continuous fluid passageway extending from the accumulator 120, through the control valve 124, and into the back end portion 134b of the fluid chamber 134. When the valve stem 114 is initially in sealed contact with the mating valve seat 132, the pressurized gas maintains the position of the valve stem to thereby block gas from flowing between the front end portion 134a and the feed tube 144 via the opening 143. In conventional actuation assemblies, however, positioning the control valve in the closed position after the primary valve is in the open position will not force the primary valve to move along the longitudinal axis until the frustoconical forward end of the valve stem makes sealing contact with the mating valve seat, as discussed below.

When the control valve 124 is actuated to move to an energized or open position as shown in FIG. 2, such as by a short electrical signal from a power source (not shown), the inner passageway formed by the conduit 127b comes into fluid communication with the release passageway formed by the port 129c, and joins the inner passageway formed by the conduit 127a and the vent passageway formed by the port 129b. This creates a continuous fluid passageway from the back end portion 134b of the fluid chamber 134, through the control valve 124, and to the atmosphere. This allows pressurized gas occupying the back end portion 134b of the fluid chamber 134 to vent to the atmosphere, creating a pressure imbalance in the fluid chamber 134 across the primary valve 112. The pressurized gas occupying the forward portion 134a causes the primary valve 112 to move along its longitudinal axis towards the back end portion 134b of the fluid chamber 134, separating the front end 130 of the valve stem 114 from the valve seat 132. Advantageously, the primary valve 112 is aligned with and attached to a release ram 142 by means of the rod 140. Continued movement of the primary valve 112 serves to drive the release ram 142 until the release ram fully engages a release mechanism (not shown), such as hooks holding the stores in racks. Additional pressurized gas from the accumulator 120 flows into and through front end portion 134a of the fluid chamber 134 and then flows through the opening 143 and into the feed tube 144 leading to ejector pistons not shown but similar to the those employed in the '312 patent.

As mentioned above, once the release ram 142 moves into engagement with the release mechanism and the primary valve 112 is in the open position as shown in FIG. 2, the primary valve by itself is unable to move back to the closed position as shown in FIG. 1 and reset the assembly for another release and ejection cycle. More specifically, the primary valve 112 has a greater surface area in communication with the front end portion 134a of the fluid chamber 134 than in communication with the back end portion 134b of the fluid chamber. In this regard, applying equal pressure to the front end portion and back end portion of the fluid chamber, e.g., when the control valve 124 is in the unenergized position, will not force the primary valve to move along the longitudinal axis until the frustoconical forward end 130 of valve stem 114 makes sealing contact with the mating valve seat 132. As a result, the accumulator 120 remains in fluid communication with the feed tube 144 through the opening 143 and the assembly 110 must be reset in order to actuate a subsequent release and ejection cycle. Conventional assemblies, such as the actuation assembly described by the '647 patent, require that the primary valve and release ram be reset manually by ground personnel, which disadvantageously increases maintenance time and introduces the possibility of human error.

By contrast, the actuation assembly 110 of the present invention overcomes the disadvantages described above by providing a bias member 150. The bias member 150, such as a spring, is disposed within the back end portion 134b of the fluid chamber 134 and is capable of automatically returning the release ram 142 and the primary valve 112 to the closed position when the control valve 124 is in the unenergized position. In one particular advantageous embodiment, the bias member 150 may be formed to automatically return the primary valve 112 to the closed position when a predetermined pressure differential is established. More particularly, the bias member 150 may be formed such that when the control valve 124 is moved from the energized to the unenergized position, the bias member does not automatically return the primary valve 112 to the closed position, but rather returns the primary valve only when the predetermined pressure differential is established across the primary valve. Advantageously, this feature allows the control valve 124 to be operable using a short electrical signal, such as a pulse, rather than requiring a constant electrical signal to the control valve.

For example purposes only, and not by way of limitation, the complete release and ejection event in one embodiment may take 200 ms to complete. Also, the initial pressure inside the accumulator of this embodiment is 5000 psi and that the control valve is pulsed to the energized position for 50 ms. During the pulse operation, the primary valve moves to the open position and the pressure in the accumulator drops from 5000 psi to 4000 psi as the pressurized air travels out of the accumulator towards the ejector pistons. If the bias member (in combination with the air pressure in the back end portion of the fluid chamber) is sufficiently aggressive to return the primary valve to the closed position as soon as the control valve moves to the unenergized position, then only a brief (50 ms) pulse of air will travel out of the accumulator towards the ejector pistons. Due to its brevity, this pulse may not provide a sufficient force of air to eject the stores from the aircraft. Accordingly, the bias member of this embodiment is formed so that a suitable amount of air moves out of the accumulator to the ejector pistons before the bias member moves the primary valve to the closed position.

In this regard, the bias member can be formed using techniques known in the art such that the primary valve is not moved to the closed position until a desired pressure threshold is met across the primary valve. In this example, the complete release and ejection event takes 200 ms. Thus, the primary valve must remain in the open position for an extended time that is longer than the 50 ms pulse, such as 150 ms or more, in order to properly eject the stores. In this embodiment, since the primary valve remains in the open position for an extended time, the pressure in the accumulator may drop to 2000 psi, after which the primary valve is moved to the closed position. In embodiments in which the bias member is a spring, the spring is formed such that the primary valve is moved to the closed position when the pressure inside the accumulator (as a function of the pressure threshold across the primary valve) is 2000 psi. In other words, the spring is designed to have a spring constant and to apply a force that moves the primary valve to the closed position once the pressure inside the accumulator reaches the desired threshold, such as 2000 psi. This pressure could be even lower than the stated 2000 psi, however, as long as a sufficient amount of air is released from the accumulator to the ejector pistons. As a result, the ejector pistons receive sufficient air force to properly release the stores, and the primary valve is automatically reset.

In conventional actuation assemblies, such as described in the '647 patent, a release and ejection cycle includes moving the primary valve to the open position, which causes the pressurized gas from the accumulator to flow into and through the front end portion of the fluid chamber and then flow through the opening and into the feed tube leading to the ejector pistons. Substantially simultaneously, the back end portion establishes direct fluid communication with the atmosphere, causing the primary valve to compressibly engage the bias member. As the primary valve continues to move toward the bias member, additional pressurized gas is able to enter the fluid chamber from the accumulator, thus increasing the speed at which the primary valve moves toward the bias member. Because the release ram is attached for joint movement with the primary valve, the release ram rapidly moves into engagement with and unlocks the release mechanism, such as hooks, holding the stores in a rack or other device. As a result of the simultaneous operation of releasing the stores and forcibly ejecting the stores, the ejector pistons can exert excessive force on the release mechanism, which can cause the stores not to release (known as a "hung store" condition) or stall the hooks from opening.

Figure 4:
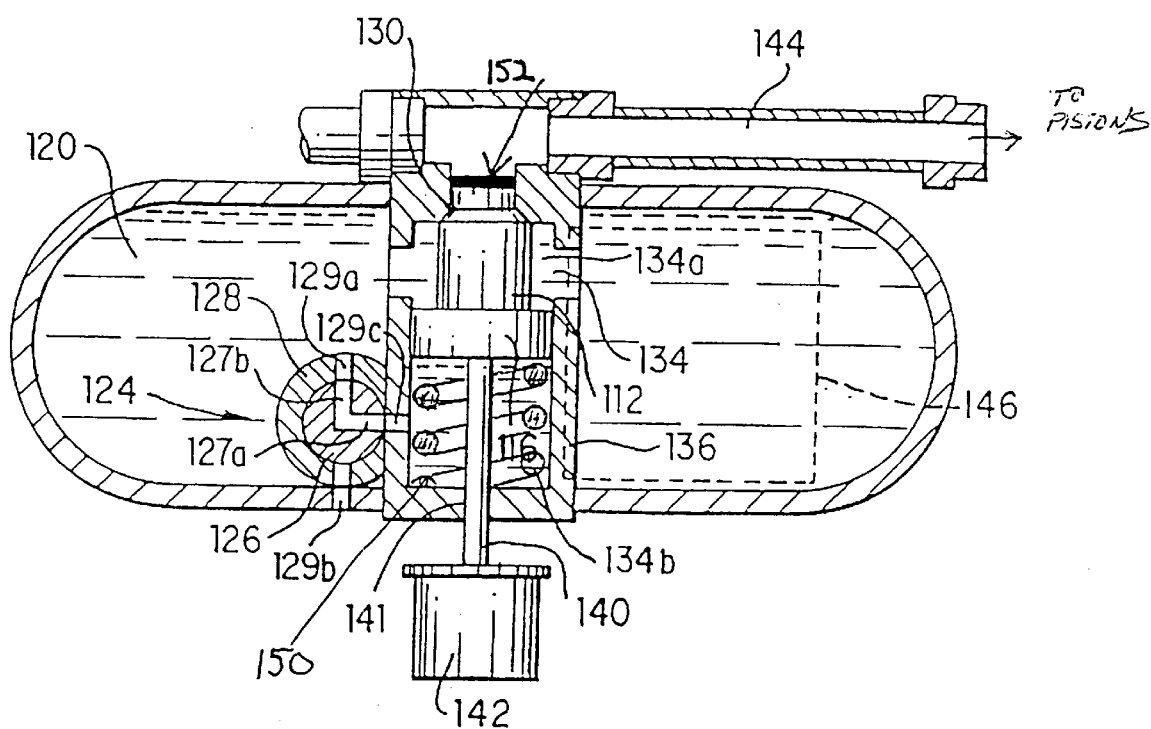
FIG. 4 is a cross-sectional view of a pneumatic accumulator and valve according to one embodiment of the present invention illustrating a sequencing tab portion.

FIG. 4 illustrates one particularly advantageous embodiment of the present invention, wherein the primary valve 112 has a shape selected to prevent fluid communication between the fluid chamber 134 and the ejector pistons until the release ram 142 fully engages the release mechanism. In one embodiment, the shape of the primary valve 112 is selected to prevent fluid communication between the fluid chamber 134 and the ejector pistons until the release mechanism is moved at least about 10–40% of its total travel distance. In particular, the shape of the primary valve 112 defines a tab member 152 extending axially outwardly from the frustoconical end 130 and capable of slidably engaging the opening 143 defined by the fluid chamber 134. In this regard, the release event caused by the release ram 142 engaging the release mechanism can be sequenced with the ejection event caused by the pressurized air engaging the ejector pistons such that the release event occurs a predetermined time interval before the ejection event. In one embodiment, the time interval is about 2–15 ms, although the particular time interval maybe different depending on the requirements of the individual system. More specifically, a release and ejection cycle according to this aspect of the present invention provides that the primary valve 112 and the release ram 142 move a predetermined distance toward the bias member 150 before the tab portion 152 disengages the opening 143 and allows the pressurized air to flow through the opening 143 and engage the ejector pistons. As a result, the release mechanism can be filly engaged to release the stores before the ejector pistons forcibly eject the stores from the aircraft.

Thus, the actuation assembly 110 and associated method of the present invention overcome several shortcomings of conventional actuation assemblies. In particular, the actuation assembly of the present invention provides a bias member 150 for automatically resetting the primary valve 112 to a closed position, which eliminates maintenance time by ground personnel for each operation cycle and eliminates human error in resetting the primary valve. Furthermore, the actuation assembly 110 of the present invention also provides a sequencing feature, wherein the primary valve 112 has a shape selected for preventing fluid communication between the fluid chamber 134 and the ejector pistons until the release ram 142 has fully engaged the release mechanism. Thus, the release event and the ejection event can be sequenced such that the release event occurs a predetermined time interval before the ejection event in order to prevent a hung store condition.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An actuation assembly for releasing and forcibly ejecting a store from an aircraft, the assembly comprising:

a primary valve for reciprocating movement within a fluid chamber between open and closed positions, said fluid chamber having a first portion in fluid communication with a pressurized gas, and a second portion selectively in fluid communication with the pressurized gas or with an environment having a pressure lower than the pressurized gas;

a release ram responsive to the primary valve and operatively connected to a release mechanism for releasing a store, said release ram engaging the release mechanism no later than when said primary valve is in the open position; and a mechanical bias member for automatically repositioning said release ram and said primary valve from the open position to the closed position.

2. An actuation assembly according to claim 1, wherein said mechanical bias member is a spring.

3. An actuation assembly according to claim 1, further comprising a control valve for initiating movement of the primary valve between the closed position and the open position.

4. An actuation assembly according to claim 3, wherein said control valve comprises a solenoid valve assembly located adjacent the fluid chamber and including an inner valve member enclosed by a sleeve member, the sleeve member defining openings therein such that movement of the inner valve member selectively allows fluid communication between the second portion of said fluid chamber and either the first portion of said fluid chamber or the environment having a pressure lower than the pressurized gas.

5. An actuation assembly according to claim 4, wherein the inner valve member defines an internal passageway extending therethrough for selectively allowing fluid communication between the second portion of said fluid chamber and either the first portion of said fluid chamber or the environment having a pressure lower than the pressurized gas.

6. An actuation assembly according to claim 4, wherein said primary valve is caused to remain in the closed position as long as the control valve is positioned such that the first portion of said fluid chamber is in fluid communication with the second portion of said fluid chamber.

7. An actuation assembly according to claim 4, wherein said primary valve is capable of moving from the closed position to the open position when said control valve is positioned such that the first portion of the fluid chamber has a pressure greater than an opposing pressure from said bias member and the second portion of the fluid chamber.

8. An actuation assembly according to claim 1, wherein the fluid chamber defines an opening such that the fluid chamber is in fluid communication with a mechanism capable of forcibly ejecting the store from the aircraft when the primary valve is in a position other than the closed position.

9. An actuation assembly according to claim 1, wherein said release ram is attached to said primary valve by a rod extending therebetween, said bias member being disposed around said rod and coaxial therewith along a single longitudinal axis.

10. An actuation assembly according to claim 1, further comprising an accumulator that encloses the fluid chamber and that includes an outer wall defining a passageway in fluid communication with the environment having a pressure lower than the pressurized gas.

11. An actuation assembly according to claim 1, wherein said primary valve includes first and second surfaces, the area of the first surface being greater than the area of the second surface.

12. An actuation assembly according to claim 1, wherein said bias member has a constant spring rate.

13. An actuation assembly according to claim 1, wherein said bias member is capable of moving said primary valve into the closed position when no more than a predetermined pressure differential is established between the first and second portions of the fluid chamber.

14. An actuation assembly for releasing and forcibly ejecting a store from an aircraft, the assembly comprising:

an accumulator for receiving and storing a quantity of pressurized gas;

a control valve having first and second positions for controlling pressure within a fluid chamber, said fluid chamber having a first portion in continuous fluid communication with the pressurized gas and defining an opening therein such that the first portion of said fluid chamber is in fluid communication with a mechanism capable of forcibly ejecting the store from the aircraft when said control valve is in the second position, and a second portion selectively in fluid communication with the pressurized gas or with an environment having a pressure lower than the pressurized gas depending on whether said control valve is in the first or second position, respectively;

a release ram capable of moving between engaged and disengaged positions in response to pressure in the second portion of said fluid chamber, said release ram operatively engaging a release mechanism when said release ram is in the engaged position; and a primary valve for reciprocating movement within the fluid chamber between open and closed positions, said primary valve having a first side being selectively in fluid communication with the first portion of the fluid chamber, and a second side in fluid communication with the second portion of the fluid chamber, the first side having a shape selected for preventing fluid communication between the fluid chamber and the mechanism capable of forcibly ejecting the store from the aircraft until the release ram fully engages the release mechanism.

15. An actuation assembly according to claim 14, wherein the shape of the first side of said primary valve is defined by a tab member for slidably engaging the opening defined by the first portion of said fluid chamber for preventing said fluid chamber from being in fluid communication with the mechanism for forcibly ejecting the store from the aircraft during movement of said release ram.

16. An actuation assembly according to claim 14, wherein said control valve comprises a solenoid valve assembly located adjacent the fluid chamber and including an inner valve member enclosed by a sleeve member, the sleeve member defining openings therein such that movement of the inner valve member selectively allows fluid communication between the second portion of said fluid chamber and either the first portion of said fluid chamber or the environment having a pressure lower than the pressurized gas.

17. An actuation assembly according to claim 16, wherein the inner valve member defines an internal passageway extending therethrough for selectively allowing fluid communication between the second portion of said fluid chamber and either the first portion of said fluid chamber or the environment having a pressure lower than the pressurized gas.

18. An actuation assembly according to claim 14, wherein said primary valve is caused to remain in the closed position as long as the control valve is positioned such that the first portion of said fluid chamber is in fluid communication with the second portion of said fluid chamber.

19. A actuation assembly according to claim 14, wherein said primary valve is capable of moving from the closed position to the open position when said control valve is positioned such that a pressure acting on the first side of the primary valve is greater than an opposing force acting on the second side of the primary valve.

20. An actuation assembly according to claim 14, wherein said accumulator encloses the fluid chamber and includes an outer wall defining a passageway in fluid communication with the environment having a pressure lower than the pressurized gas.

21. A method of releasing a store from an aircraft, the method comprising:
   providing a first pressure inside a fluid chamber having a first portion and a second portion such that the aircraft continues to carry the store;
   creating a pressure differential between the first and second portions of the fluid chamber;
   engaging a release mechanism with a release ram in response to the pressure differential for releasing the store from the aircraft; and
   automatically disengaging the release ram from the release mechanism while the aircraft is in flight following release of the store.

22. A method according to claim 21, wherein the release mechanism engaging step comprises extending the release ram in response to the pressure differential between the first and second portions of the fluid chamber, and wherein said release ram automatically releasing step comprises automatically retracting the release ram into the fluid chamber while the aircraft is in flight following release of the store.

23. A method according to claim 21, further comprising forcibly ejecting the store from the aircraft following engagement of the release mechanism.

24. A method according to claim 23, wherein the ejecting step is delayed for a period of time after the release ram fully engages the release mechanism.

* * * * *